May 8, 1962          K. BRAND          3,033,230
VALVE, PARTICULARLY FOR HYDRAULIC CONTROL SYSTEMS
Filed July 18, 1957
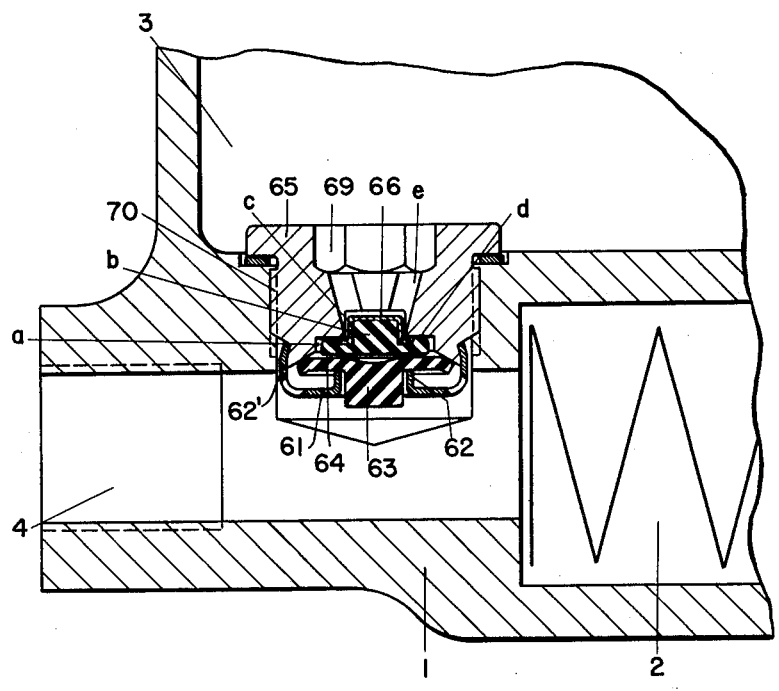

ns of the plurality of apertures in said supporting
United States Patent Office 3,033,230
Patented May 8, 1962

3,033,230
VALVE, PARTICULARLY FOR HYDRAULIC CONTROL SYSTEMS
Karl Brand, Ebern, Lower Franconia, Germany
Filed July 18, 1957, Ser. No. 672,666
Claims priority, application Germany July 19, 1956
4 Claims. (Cl. 137—512)

The main patent, No. 2,925,093, issued Feb. 16, 1960, of which the present application is a continuation in part, relates to a valve which is arranged at the open end of the master cylinder of a hydraulic power transmitting system, particularly of a hydraulic brake system as used in automotive vehicles, which valve serves to provide a communication between the master cylinder and a fluid reservoir, this communication being controlled by said valve, the valve comprising a valve member made of an elastic organic material and clamped between the valve body and an apertured carrier member located at a fixed distance therefrom, in such a manner that the peripheral portion of the upper side of said valve member cooperates with a suitably shaped portion of the said valve body in a manner providing an opening and closing action of the valve, the central portion of the valve member or disc resting with its under side on said carrier member. According to a preferred embodiment of the main patent, this valve assembly forms a self-contained structural assembly or unit.

The present invention provides for an advantageous development and improvement of the valve of the main patent, No. 2,925,093 the valve of the present invention being characterized by the fact that between the valve member or disc and the valve body there is arranged, in a recess provided in the valve body, a second valve member or disc which has a sealing lip which is in contact with the bottom of the said recess. According to another aspect of the present invention, the valve member or disc may have a projecting boss which is guided in a smaller recess of the valve body. A particularly advantageous embodiment of the invention is provided by fitting the said boss with a metallic cap member an upper edge portion of which is recessed into an opening affording a sealing surface, and by providing the valve body, according to still another aspect of the invention with inlet bores which are so disposed as to debouch into a smaller recess of the valve body. Thus, the present invention provides for a double sealing action after the drawing-in action, this double sealing action affording a higher degree of freedom from trouble that might otherwise arise from the accumulation of foreign matter or particles abraded from rubber parts and other parts during operation of the system or from particles introduced in the brake system while the brake fluid supply is being replenished.

Further objectives and advantages of the invention will be apparent during the course of the following specification, when read in connection with the accompanying drawing which shows, in a fragmentary longitudinal section, a preferred embodiment thereof.

The casting 1 comprises the master cylinder 2 of a hydraulic brake system, the brake fluid reservoir 3 and a duct section 4 to which the pipe lines or the like leading to the actuating cylinders may be connected. Disposed at the open end of the master cylinder is a valve which controls a communication between the master cylinder and the brake fluid reservoir. This valve comprises a valve body 65 and a valve disc 64 which is arranged between the valve body and an apertured carrier member 61 held at a fixed distance from the valve body, in such a manner that the peripheral portion of the upper side of the valve disc cooperates with a complementarily shaped portion of the valve body to open and close the valve, the central portion of the valve disc abutting, with its under side, the said carrier member. The carrier member 61 is in the form of an annular pot-shaped member the central flange 62 of which serves to guide a cylindrical boss 63 provided on the under side of the valve disc. It will be seen in the drawing that upturned portion of the central flange 62 also supports the valve disc 64 itself. The external wall 62' of the carrier member is attached to the valve body 65 by a rolling or peening operation. The end face of the valve body 65 remote from the valve disc 64 is provided with a polygonal recess or socket 69 adapted to receive a suitable spanner by means of which the valve unit is inserted into the threaded bore 70 of the casting 1. Up to this point of the description, the construction is identical with that of the valve disclosed in the main patent, No. 2,925,093.

According to the present invention, there is now arranged between the valve disc 64 and the valve body 65, in a recess "a" of the valve body, another valve disc "c" which is preferably made of rubber. This additional valve disc "c" has a peripheral sealing portion "d" which is adapted to be seated against the bottom of the recess "a." Furthermore, the valve disc "c" has a central boss resembling the cylindrical boss 63 of the first-mentioned valve disc 64. This boss carries a metallic cap member "b" a peripheral portion of which is recessed into the sealing surface of the valve disc "c" which latter is thus guided within the recess 66 of the valve body 65 by means of the boss and the metallic cap fitted thereonto. The inlet passages "e" debouch in the recess 66 of the valve body 65. A suitable clearance is provided between the walls of the recess 66 and the cap member "b," this clearance forming a fluid passage permitting the fluid from the reservoir to flow through the valve whenever the piston (not shown) in the cylinder 2 is withdrawn. After the piston has been moved to operate the brakes, a vacuum will be produced which will lift the valve disc "c" from its seat and which will cause the valve disc "c" to move into contact with the valve disc 64 which latter will also be lifted from its seat.

It will be appreciated from the foregoing that the present invention provides a double suction valve of simple, inexpensive and dependable construction which forms a self-contained unit capable of being screw-threadedly mounted between the master cylinder and the fluid reservoir, the mounting of the valve unit being an extremely simple operation.

While the foregoing description primarily refers to FIG. 12 of the main patent, No. 2,925,093, it will, of course, be understood that the present invention is applicable to all of the embodiments disclosed in the said main patent.

The drawing and the foregoing specification constitute a description of the improved valve in such full, clear, concise and exact terms as to enable any person skilled in the art to practice the invention, the scope of which is indicated by the appended claims.

What I claim:
1. A valve for use in a hydraulic control system of an automotive vehicle comprising a valve body having bores therethrough, a supporting element defining a plurality of apertures fixed in spaced relation to said valve body, a substantially disc-shaped valve member made of elastic organic material and arranged between said valve body and said supporting element with a slight preload existing in the valve member between its rim so that it is normally sealingly pressed against the sealing surface of said valve body and the part of the said valve member which rests against said supporting element, said rim being free to flex and said valve member being free to move towards said valve body when heavy pressure is exerted through the apertures of said supporting element, and a second valve member made of elastic organic material and being substantially disc-shaped and being arranged between said valve body and said first valve member in a recess of said valve body having a relatively rigid intermediate portion overlying said bores and having a freely movable peripheral sealing portion adapted to be brought into sealing relationship with the bottom surface of said recess responsive to a force on the second valve member directed toward said valve body, both of said valve members being free to move against said valve body when said first valve member is heavily pressed towards said valve body, said first valve member and said supporting element defining a mutually coacting means to space said first valve member from the apertures of said supporting element, and said mutually coacting means providing said preload of said first valve member and preventing the restriction of said apertures by said first valve member.

2. A valve as defined in claim 1, wherein said second valve member is provided with a boss by means of which it is guided in a further recess of said valve body, said bores being included in said further recess.

3. A valve as defined in claim 2, wherein said intermediate portion comprises a metallic cap having a peripheral flange on its open end the diameter of which is greater than that of said further recess of said valve body.

4. A valve as defined in claim 3, wherein the inlet passages of said valve body open in said further recess.

References Cited in the file of this patent

UNITED STATES PATENTS

| | | |
|---|---|---|
| 1,627,680 | Vollmann | May 10, 1927 |
| 2,112,356 | Bock | Mar. 29, 1938 |
| 2,394,911 | Grisworld | Feb. 12, 1946 |
| 2,580,850 | Seppmann | Jan. 1, 1952 |
| 2,590,408 | Henneman | Mar. 25, 1952 |
| 2,752,942 | Trevaskis | July 3, 1956 |
| 2,758,609 | Dickert et al. | Aug. 14, 1956 |
| 2,769,457 | Wittenberg | Nov. 6, 1956 |
| 2,820,569 | Peterson | Jan. 21, 1958 |
| 2,925,093 | Brand | Feb. 16, 1960 |

FOREIGN PATENTS

| | | |
|---|---|---|
| 292,495 | Italy | Jan. 20, 1932 |
| 865,415 | Germany | Feb. 2, 1953 |